United States Patent Office 3,151,682
Patented Oct. 6, 1964

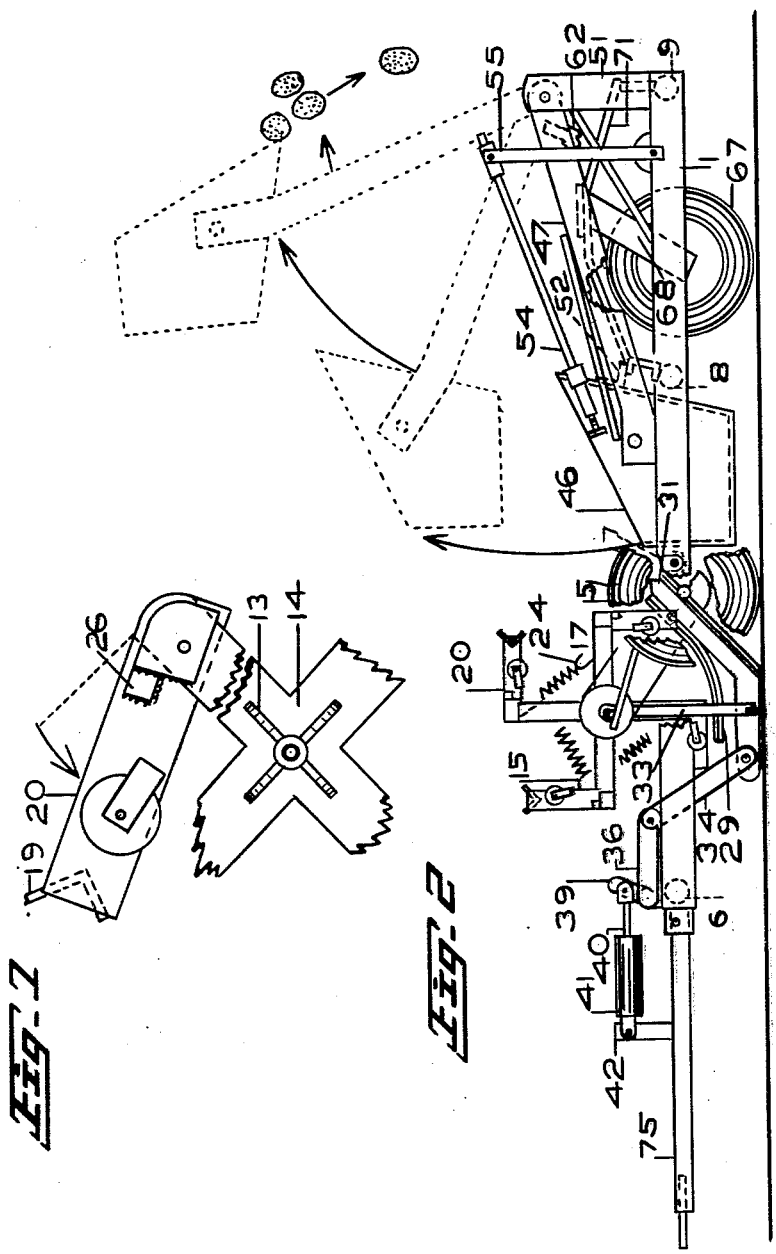

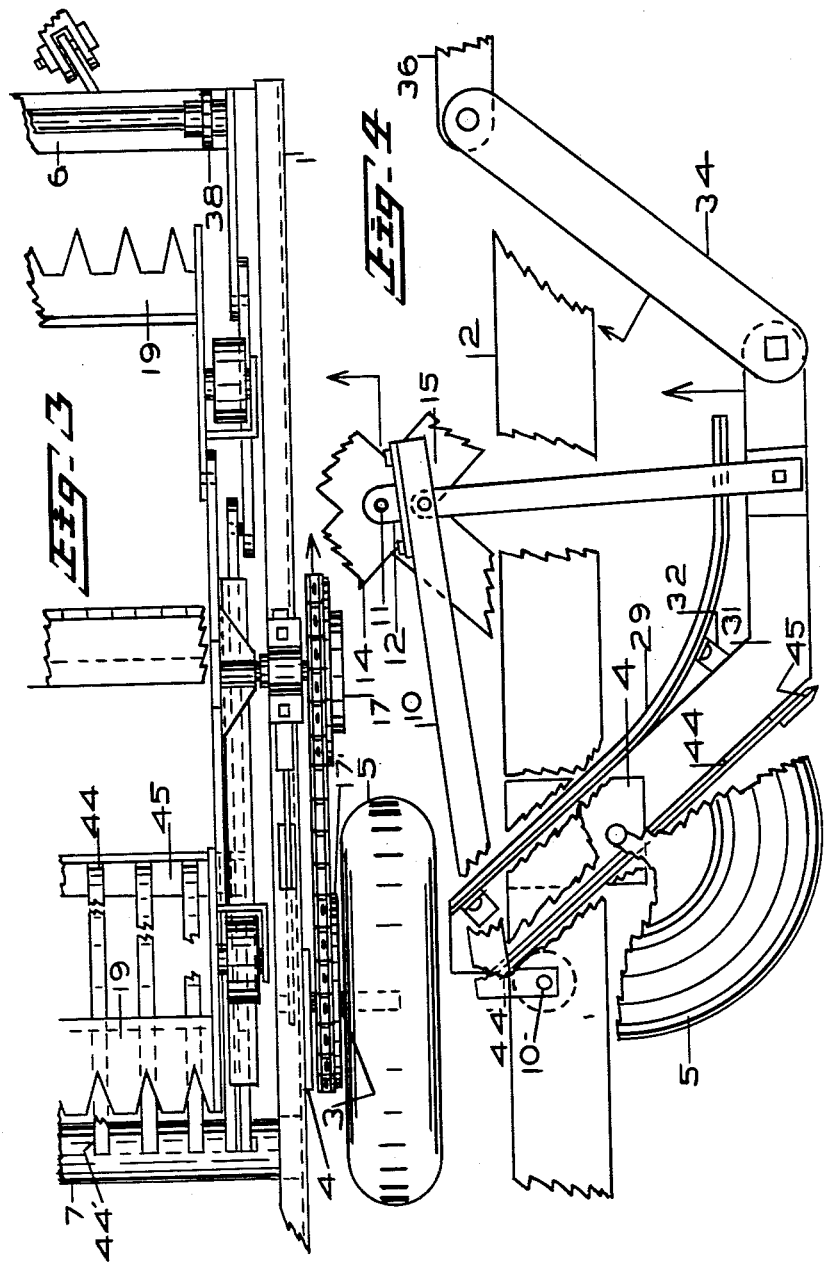

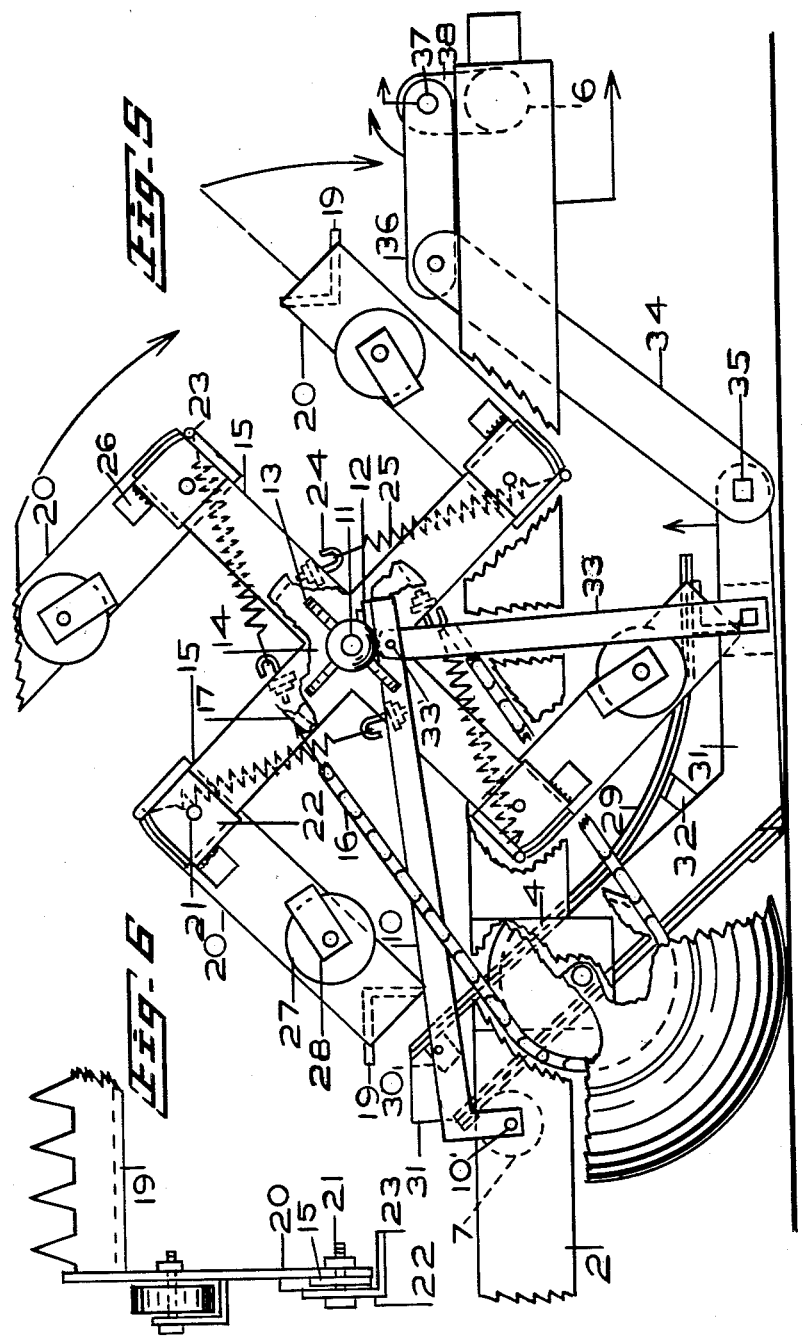

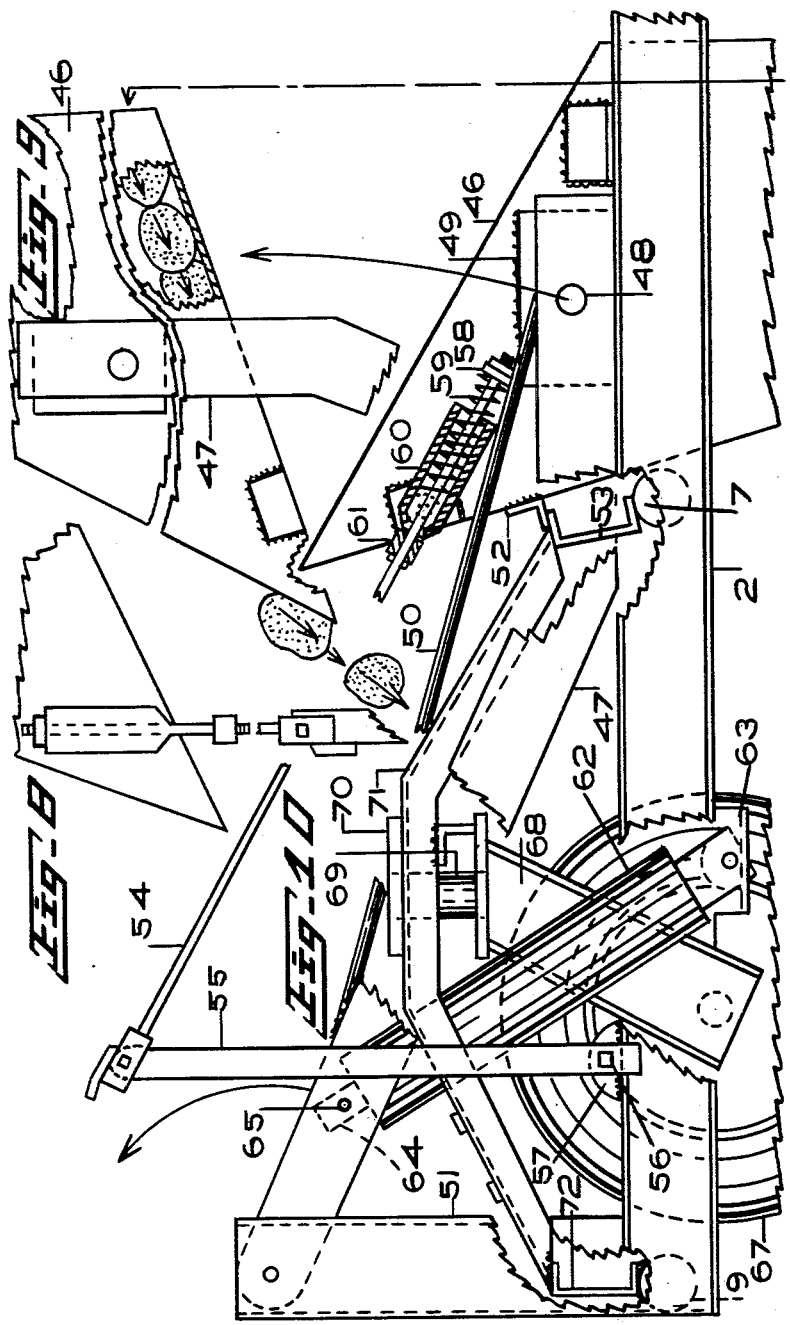

3,151,682
STONE PICKING MACHINE
Rosaire Bussiere, Vonda, Saskatchewan, Canada
Filed May 13, 1963, Ser. No. 279,763
2 Claims. (Cl. 171—63)

This invention relates to stone picking machines, having particular reference to a machine embodying a reel for dislodging the stones and moving them rearward to a bucket, and with an intervening grate between the reel and bucket for disposing of loose soil picked up by the reel.

In the art to which the invention relates a stone picking implement of the above character is not in itself new. The present invention is concerned with improvements in the reel and in the bucket dumping connections, aimed primarily at more effectively dislodging the stones from the ground and moving them rearward to the bucket, and in improving the mounting for the bucket and the dumping mechanism.

These features and advantages will become apparent by reference to the accompanying description taken in conjunction with the drawings.

In the drawings, wherein is illustrated a preferred embodiment of the invention, FIG. 1 is a top plan view of the machine, illustrating movement of stones from the ground to the bucket.

FIG. 2 is a side view of the machine, shown with parts broken away, and indicating in dashed lines the movement of the bucket in dumping the stones.

FIG. 3 is an enlarged top plan view of a fragment of the forward portion of the machine, showing particularly the mounting and a drive connection for the reel, and including a portion of the grate, shown with parts broken away.

FIG. 4 is an enlarged side view of a fragment of the front portion of the machine, with parts broken away, showing the mounting for the reel shaft and elevating connection, and including a track.

FIG. 5 is an enlarged side view of a portion of the front of the machine, including the reel and the mounting and drive connections for the reel, and the connections for raising and lowering the reel.

FIG. 6 shows a detail enlarged fragment of the reel showing a portion of a blade and a stone picking blade mounting arm.

FIG. 7 is an enlarged side view showing a fragment of the reel body members and spidered for mounting the reel on the shaft, and including a blade mounting arm attached to a reel body member arm, with movement of the blade mounting arm indicated in dashed lines.

FIG. 8 is an enlarged side view of a fragment of the bucket and a guide arm for the bucket, with the arm shown broken away.

FIG. 9 is an enlarged side view, broken away, of the bucket and the elevating arm for the bucket, and illustrating movement of discharging stones from the bucket.

FIG. 10 is an enlarged side view of a portion of the rear end of the machine, including the bucket and the mounting for the bucket, shown with parts broken away, and partly in section.

Figure 1:
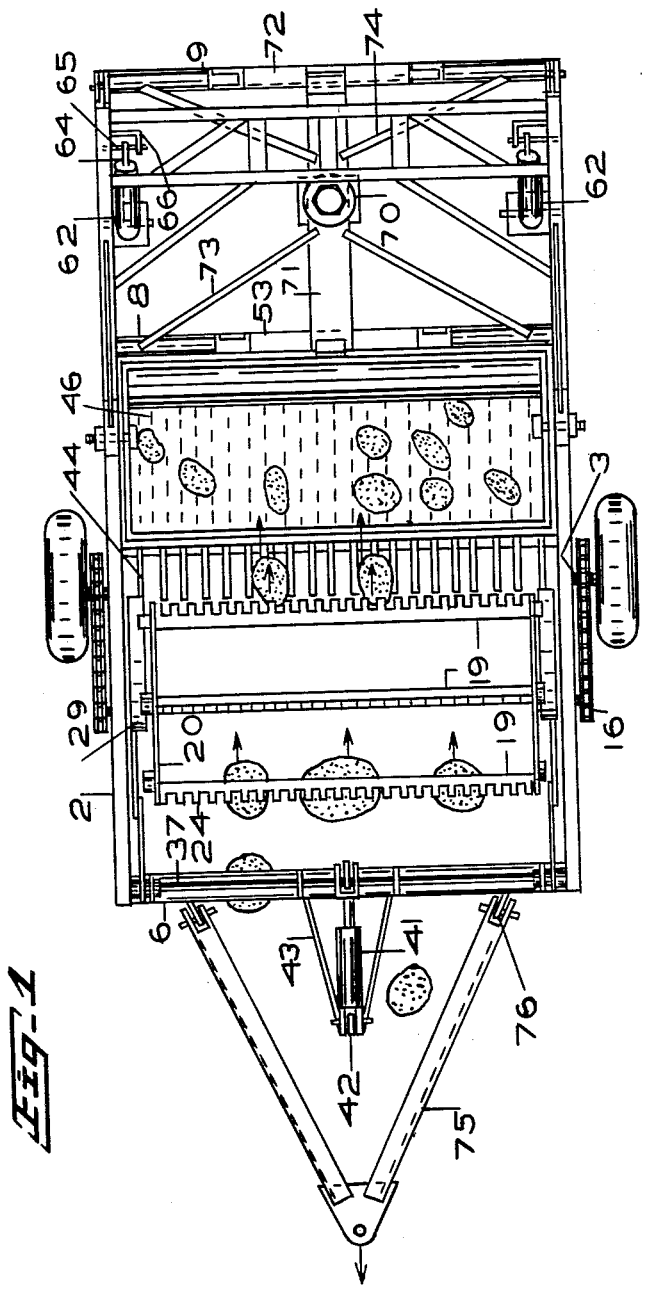

Having reference to the drawings, frame side bars 1 and 2 mount axle shafts 3 in bearing elements 4 (FIG. 3) and to the axle shafts are fixed ground wheels 5. The frame side bars are connected by tubular cross bars 6, 7, 8 and 9 (FIG. 2).

Pivoted on pins 10′ on the side bars 1 and 2 are arms 10 (FIGS. 4 and 5) mounting a reel shaft 11 in bearings 12. On the shaft 11 are fixed spiders 13, one to each end of the shaft (FIGS. 5 and 7), on which are mounted reel body members 14 having radial arms 15. The shaft 11 is driven from both sides by chains 16 trained over sprockets 17 on the reel shaft 11, and over sprockets 17′ on the shaft 7, as shown in FIGURE 3.

On the arms 15 are carried stone dislodging and moving blades 19 on blade mounting arms 20 (FIG. 5) attached to the reel arms 15 by bolts 21. On the bolts 21 are plates 22 with integral pins 23 (FIG. 6) to which attach springs 25 (FIG. 5) that are anchored by hooks 24 to the arms 15, the springs opposing movement of the arms 20 in the direction shown in FIGURE 7, to allow the arms to pass over an obstruction where necessary. The arms 20 include integrally fixed guide blocks 26 to which the plates 22 are fixed.

On the blade mounting arms 20 are rollers 27 mounted in brackets 28 on the arms, these rollers being adapted for travel on tracks 29 (FIGS. 4 and 5), the tracks attaching at their upper ends by brackets 30 on reel supporting arms 31, and lower by brackets 32 attached to the arms 31. The arms 31 are attached by arms 33 to the shaft mounting arms 10 by pins 33′, and at their rear ends bear against the tubular frame cross bar 7.

To the forward ends of the reel supporting arms 31 are pivotally attached links 34 by pins 35 (FIGS. 2 and 5) these links pivotally engaging arms 36 fixed to a shaft 37 mounted free to turn in bearing lugs 38 on the tubular frame cross bar 6. To the shaft 6 is fixed an upstanding arm 39 (FIG. 2) that is engaged by the piston rod 40 (FIGS. 1 and 2) of a hydraulic element 41 that is anchored to an upstanding arm 42 on a bracket 43 (FIG. 1) fixed to the forward tubular bar 6.

By the brackets 32 (FIG. 4) is forwardly supported a grate (FIGS. 3 and 4) formed of a series of slats 44 attached to a grate bar 44′ supported rearwardly by the tubular bar 7, and to a grate bar 45 engaged by the brackets 32 (FIG. 4).

This grate is interposed between the reel and a dump bucket 46 that is carried by arms 47 pivoted by trunnions 48 (FIG. 10) to plates 49 that are fixed to the bucket sides, as by welding, and rearwardly pivoted on upstanding frame bars 51 (FIGS. 2 and 10) fixed to the frame side bars 1 and 2. The bucket includes a stop 52 engaging a plate 53 on the cross bar 7. The bucket carrying arms 47 are braced by rods 50 (FIG. 10) fixed, as by welding, to the arms.

For keeping the bucket from tilting during the dumping movement rods 54 (FIGS. 2 and 10), one to each end of the bucket, are rearwardly pivotally attached to upstanding standards 55 that attach to the frame bars 1 and 2 by pins 56 engaging lugs 57 fixed on the frame bars. These rods 54 are endwise slidable in lugs 58 (FIG. 10) fixed to the bucket, and are cushioned by springs 59 on the rods in casings 60 that are held by collars 61 fixed to the rods.

For raising and lowering the bucket, hydraulic elements 62 (FIGS. 1 and 10) are anchored to plates 63 fixed to the side bars 1 and 2, and have piston rods 64 pivotally engaging pins 65 (FIG. 1) mounted in brackets 66 on the bucket carrying arms 47.

Rearwardly the machine is supported on a castor wheel 67 (FIGS. 1 and 2) mounted in a fork 68 with shank set in a turning plug 69 (FIG. 10) mounted in a bracket 70 (FIGS. 1 and 10) carried by a frame 71 that is forwardly supported welded to the U plate 53 and rearwardly welded to a U plate 72 on the cross bar 9 (FIG. 1). The frame bar 71 is braced forwardly and rearwardly of the turning plug by bars 73–74 (FIG. 1).

For attaching the stone picker in following relation to a tractor, a draft assembly 75 (FIGS. 1 and 2) is provided coupled at 76 to the front tubular frame bar 6.

In the use of the device stones to be gathered are dislodged by the reel blades 19 and moved backward by the rotating reel over the grate bars 44 into the bucket 46.

The arms 20 carrying the blades 19 may move inward, as shown in FIGURE 7, to pass over the surface of an imbedded stone, this inward movement of the arms being opposed by the springs 25. The reel is driven by the chains 16 from the ground wheel axle shafts 3. For raising the reel the hydraulic element 41 (FIG. 2) is used to turn the shaft 37 (FIG. 5), this raising the reel supporting arms 31 through the connection by the links 34 and arms 36.

When a load has been accumulated in the bucket, the bucket may be raised by the arms 47, the bucket being held from dumping prematurely by the rods 54, the arms 47 being actuated by the hydraulics 62.

What I claim and wish to secure by Letters Patent is:

1. In a stone picking machine of a character in which stones are dislodged from the ground by a reel and moved rearwardly over a grate into a bucket, the machine including a reel shaft and uprights on which the shaft is mounted, an improved reel comprising reel body members fixed on the shaft one to each end portion thereof, said members including integral radial arms at quarterly intervals, a blade mounting arm pivotally attached at one end to each radial arm extending rearwardly relative to the travel of the reel, said radial arms having stop means fixed thereto limiting forward movement of the blade mounting arms on the radial arms to positions at right angles thereto, a coiled spring anchored to each radial arm inwardly thereof and attached to a next forwardly succeeding blade carrying arm rearwardly of the pivotal mounting of the blade carrying arm, said springs opposing rearward movement of the blade carrying arms, a pair of tracks mounted on the grate, one to each side thereof, and rollers on the blade carrying arms for travel on the tracks.

2. In a stone picking machine as set out in claim 1 and including arms pivoted to the machine and on which the bucket is pivotally carried to tilt rearwardly in dumping the bucket, means holding the bucket against tilting until the bucket mounting arms are upwardly extended sufficiently to dump the contents of the bucket rearwardly of the machine, said means comprising uprights rearwardly fixed to the machine frame, rods pivoted to the uprights, lugs on the upper rear end of the bucket in which the rods are slidable, and spring means on the rods anchored thereto and bearing against the lugs, said spring means holding the bucket against tilting until the bucket carrying arms are upwardly extended.

References Cited in the file of this patent
UNITED STATES PATENTS

| | | |
|---|---|---|
| 2,213,370 | Reiter | Sept. 3, 1940 |
| 2,738,633 | Bestland et al. | Mar. 20, 1956 |
| 2,781,623 | Anderson | Feb. 19, 1957 |
| 2,793,482 | Jurgens | May 28, 1957 |